May 7, 1963     D. R. HOLDREN     3,088,611
TRACTOR MOUNTED LIFT

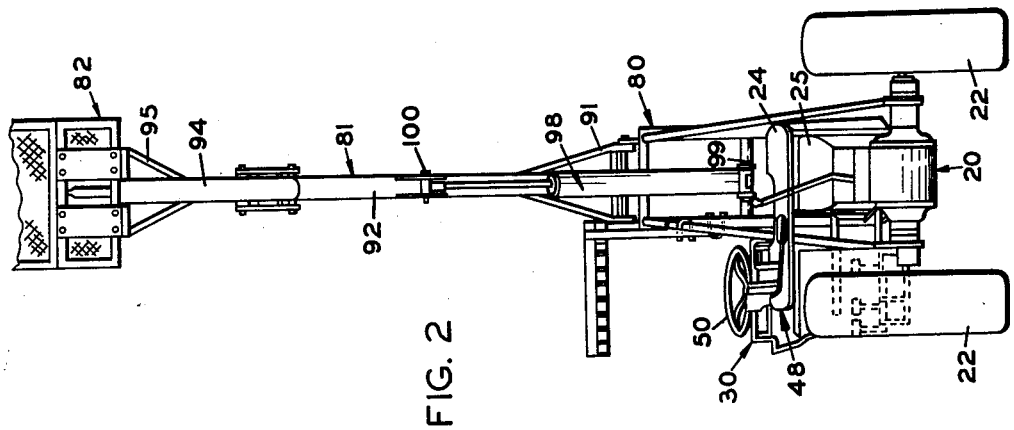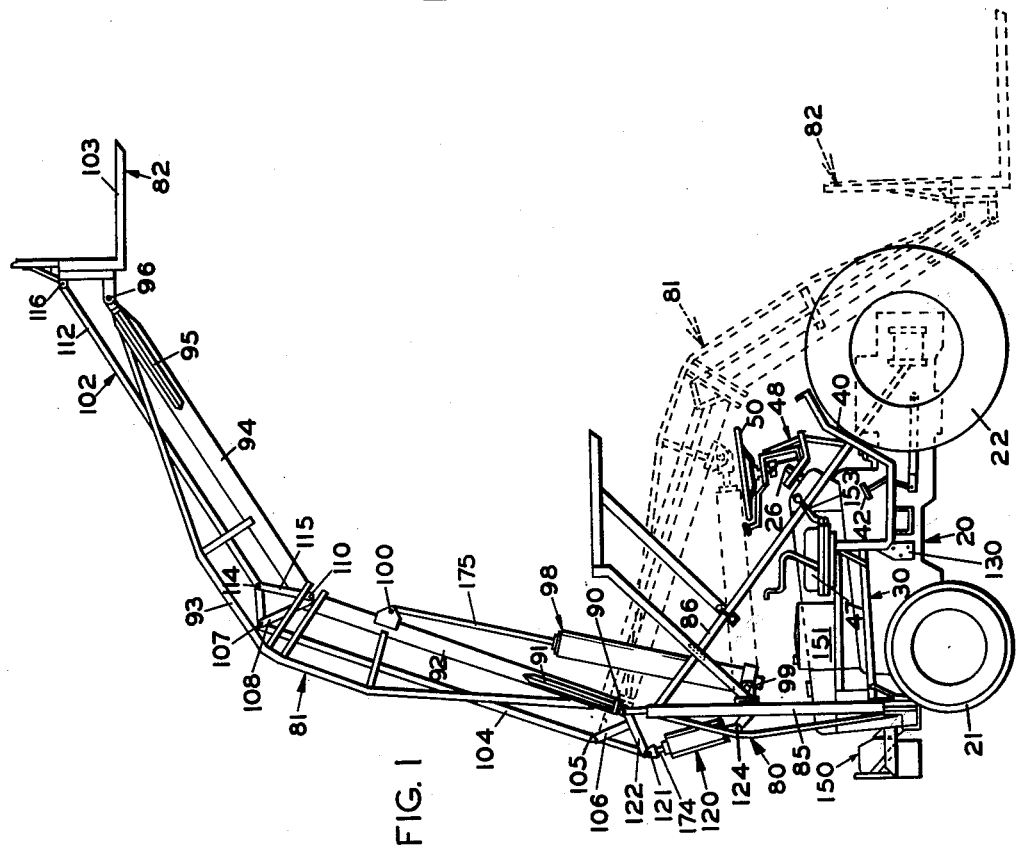

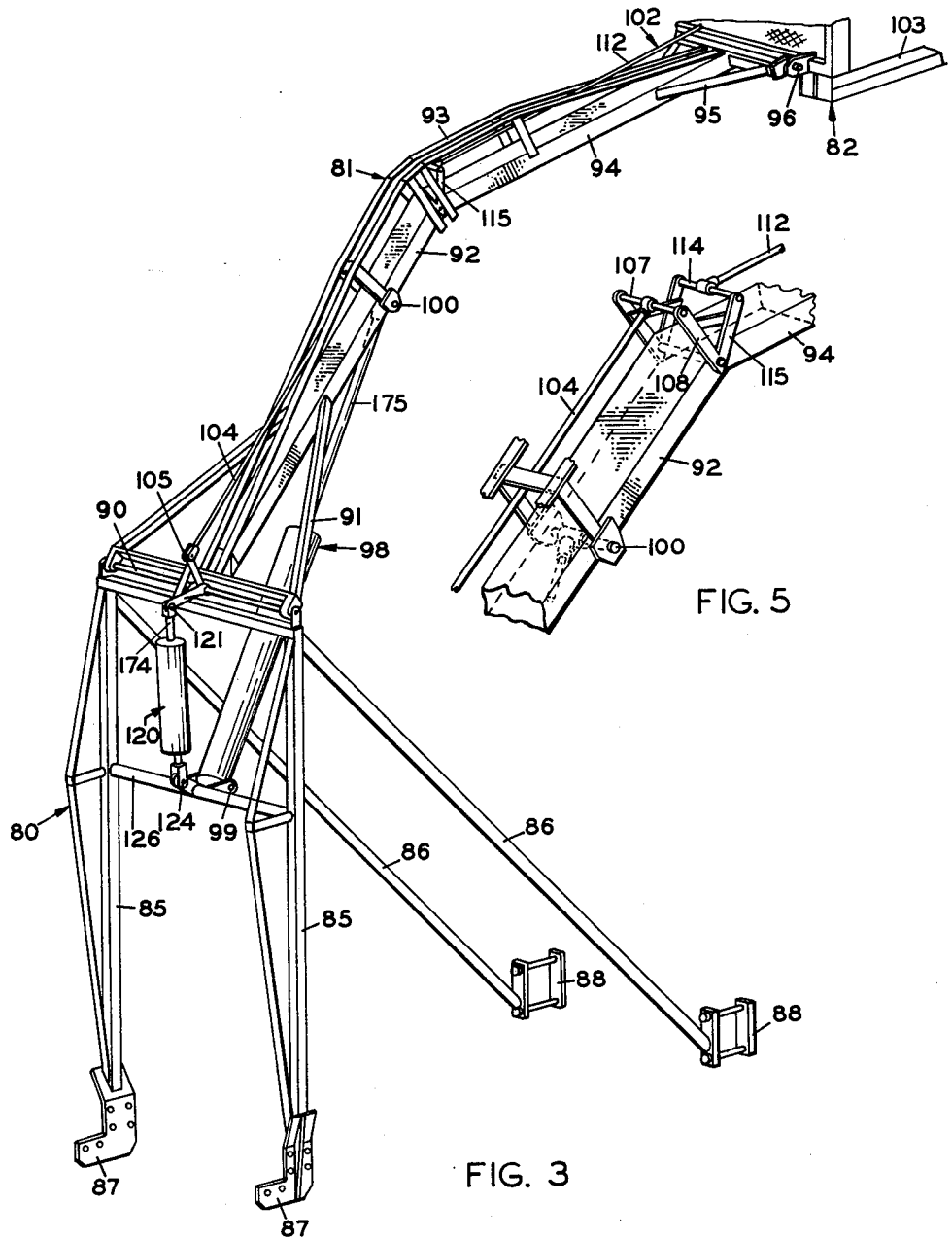

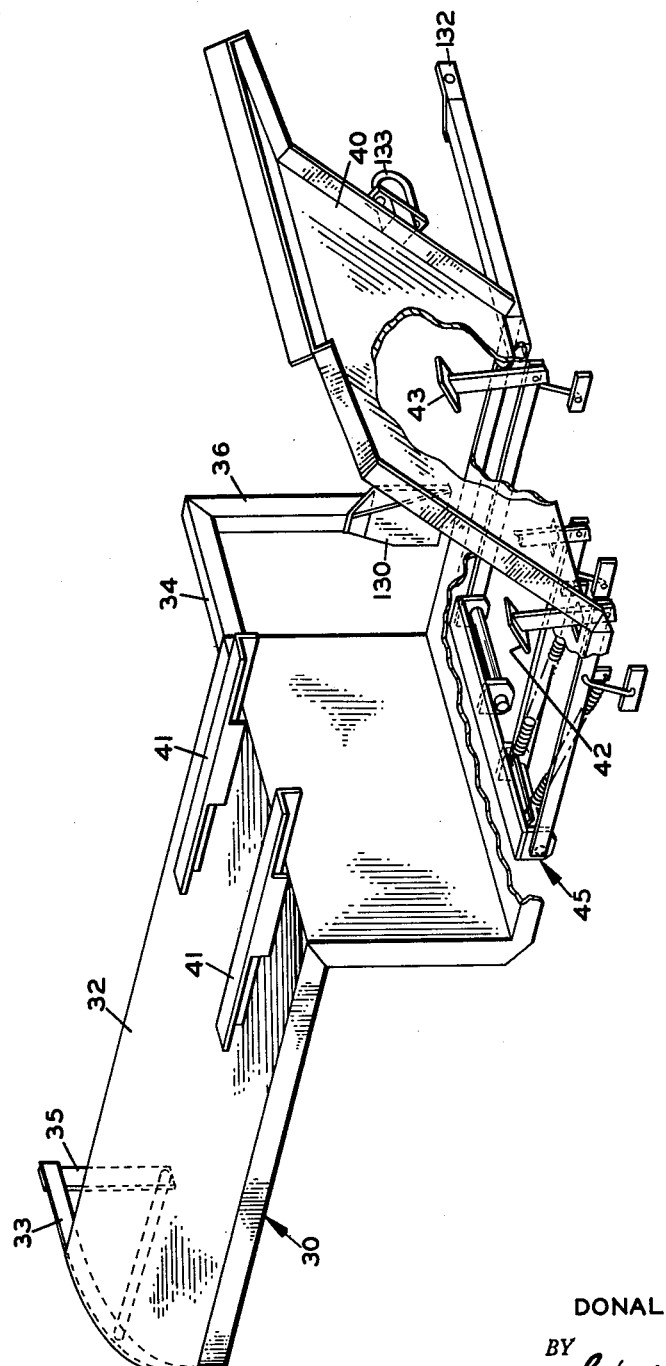

Filed March 25, 1959     6 Sheets-Sheet 4

INVENTOR.
DONALD R. HOLDREN

BY *Schmieding and Fultz*

ATTORNEYS

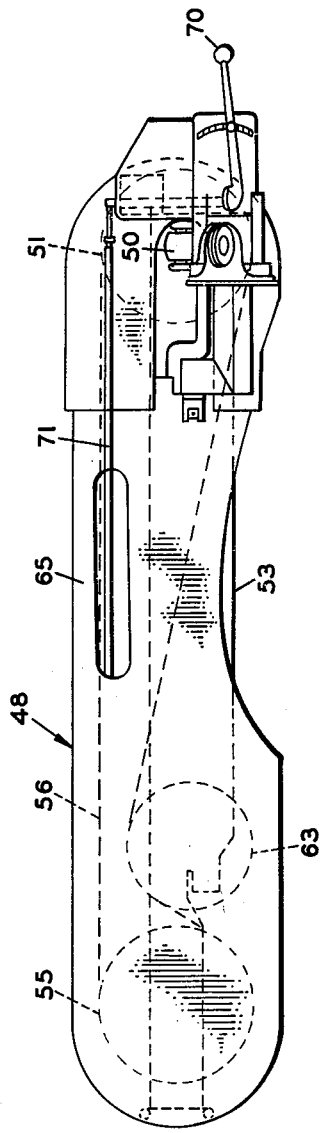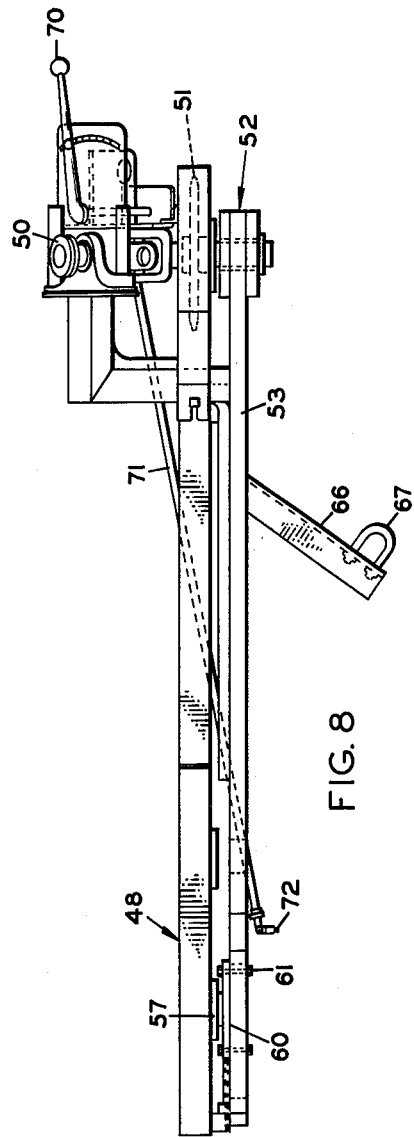

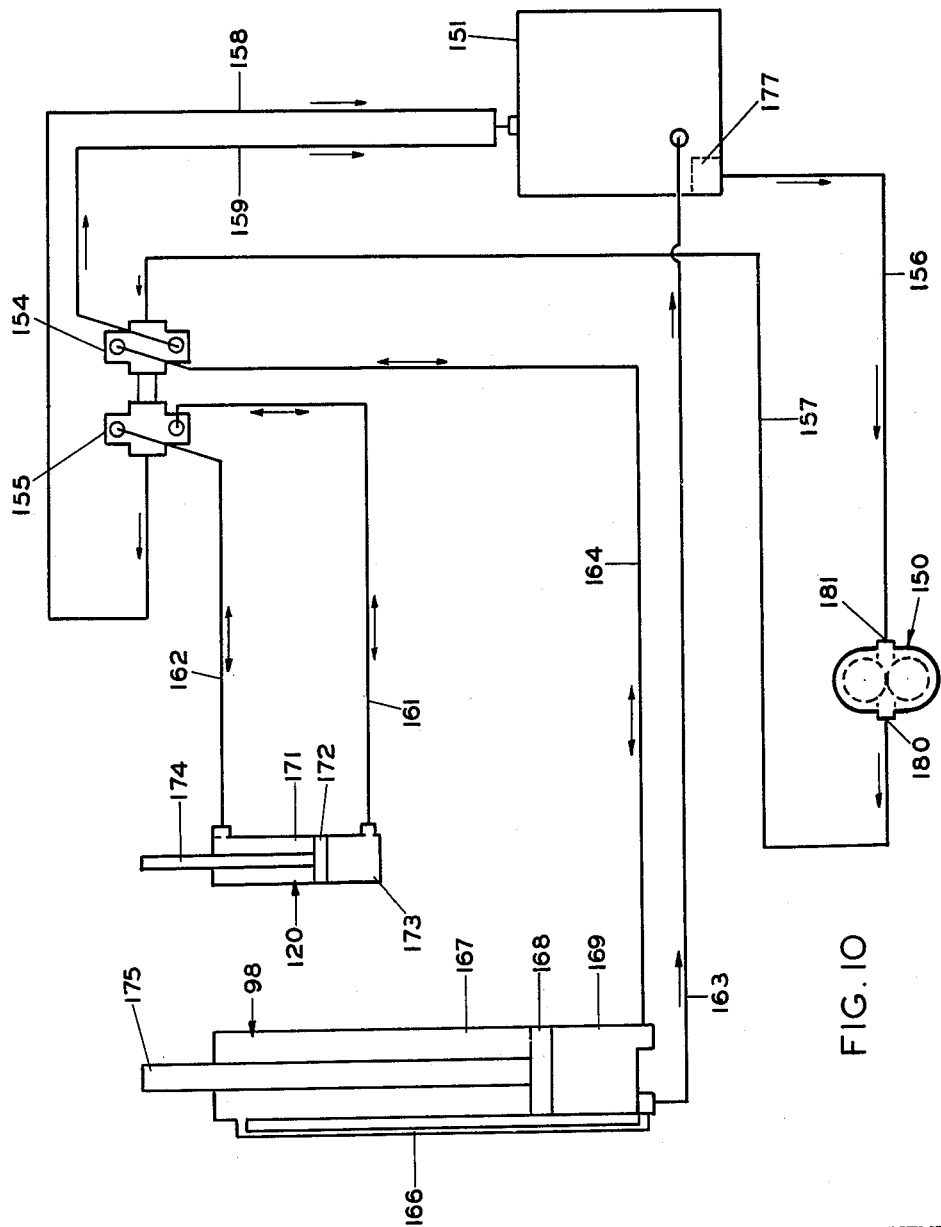

United States Patent Office 3,088,611
Patented May 7, 1963

3,088,611
TRACTOR MOUNTED LIFT
Donald R. Holdren, West Liberty, Ohio, assignor to Holdren Brothers, Inc., West Liberty, Ohio, a corporation of Ohio
Filed Mar. 25, 1959, Ser. No. 801,810
6 Claims. (Cl. 214—140)

This application relates to apparatus for lifting loads and particularly such an apparatus that is adaptable in a novel manner to be tractor mounted.

In general, the apparatus of the present invention includes a rearwardly facing seat and steering assembly mounted on a conventional tractor such that the operator will face the rear of the tractor at a location to the side of the original forwardly facing seat and steering assembly.

The apparatus further includes a lift assembly having a boom pivotally mounted to the forward portion of the tractor and extended rearwardly over the location normally occupied by the conventional forwardly facing seat and steering assembly. The boom, when in its lowermost position includes, on its extreme end, a platform which can be disposed under a load. The platform can be raised, by manipulating the boom, from a ground position to various elevated positions as desired.

In accordance with the present invention, the base of the boom of the lift assembly is mounted to the extreme forward portion of the tractor and extended rearwardly to a position behind the rear wheels whereby substantially the entire length of the tractor extends from the pivoted base of the boom towards the load being lifted. This boom arrangement provides a more stable configuration, as compared to prior designs for tractor mounted lifts wherein the booms are extended forwardly from the front of the tractor, and permits heavier loads to be lifted without causing the wheels of the tractor to leave the ground. Not only is the wheel base of the tractor extended under the boom and towards the load but, in addition, the engine of the tractor, which is the heaviest portion of the vehicle, is positioned as far as possible from the rear wheel pivot center of the tractor. The weight of the engine of the tractor is thereby most effectively utilized in preventing the load from lifting the wheels or upsetting the tractor about said rear wheel pivot center.

As another aspect of the present invention, the present apparatus includes a lift apparatus attachment for a tractor which incorporates a novel boom and linkage mechanism for raising, lowering, and tilting a load supporting platform.

It is therefore an object of the present invention to provide a novel lift apparatus for a tractor which includes a rearwardly facing seat and steering mechanism for use with a rearwardly extending boom assembly.

It is another object of the present invention to provide apparatus of the type described which includes an offset rearwardly facing steering assembly and associated driving means for connecting said steering assembly with the conventional steering mechanism of the tractor.

It is still another object of the present invention to provide a lift apparatus for attachment to a tractor which includes a novel boom and linkage mechanism for raising, lowering, and tilting a load supporting platform.

Further objects and advantages of the present invention will be apparent from the following description, reference being had to the accompanying drawings wherein a preferred form of embodiment of the invention is clearly shown.

In the drawings:

FIG. 1 is a side elevational view showing the apparatus of the present invention in mounted relationship on a conventional tractor;

FIG. 2 is a rear elevational view of the apparatus of FIG. 1;

FIG. 3 is a perspective view of a lift assembly attachment comprising a portion of the apparatus of the preceding figures;

FIG. 4 is a perspective view of a rearwardly facing seating and steering assembly comprising a portion of the apparatus of FIG. 1 and 2;

FIG. 5 is a partial perspective view of a portion of the apparatus of FIG. 3;

FIG. 8 is a front elevational view of driving means for the steering mechanism comprising a portion of the apparatus of the present invention;

FIG. 9 is a top elevational view of the apparatus of FIG. 8; and

FIG. 10 is a diagrammatic view showing a control system comprising a portion of the apparatus of the present invention.

Figure 6:
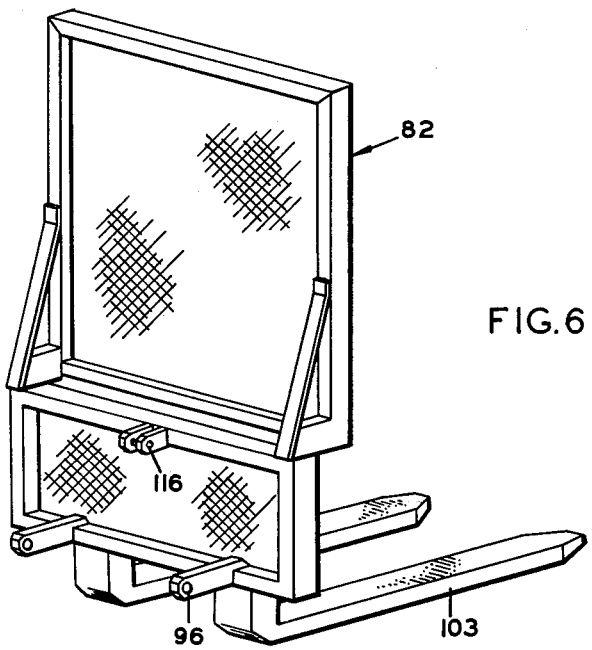
FIG. 6 is a perspective view of a load supporting platform comprising a portion of the apparatus of the preceding figures.

Referring in detail to the drawings, FIGS. 1 and 2 illustrate a conventional tractor which includes main frame 20, front wheels 21, rear wheels 22, a conventional forwardly facing steering position 24, a conventional forwardly facing seating position 25 and a conventional steering shaft 26.

With continued reference to FIG. 1 the tractor is provided with an attachment indicated generally at 30 which fits over the top of the tractor and forms a rearwardly facing seating and steering assembly.

Referring next to FIG. 4 assembly 30 includes a hood 32, laterally extending frame members 33 and 34, and vertically extending frame members 35 and 36, adapted for attachment to the side of a tractor.

With continued reference to FIG. 4, assembly 30 includes a footboard 40, seat supports 41, and clutch and brake pedals 42 and 43. Suitable link mechanisms indicated generally at 45, connect brake and clutch pedals 42 and 43 with the conventional clutch and brake mechanisms of the tractor.

As seen in FIG. 1 assembly 30 supports a rearwardly facing seat 47 and an offset steering mechanism indicated generally at 48, the latter including a steering wheel 50 located in front of rearwardly facing seat 47.

Reference is next made to FIGS. 8 and 9 which illustrate in detail the previously mentioned offset steering mechanism 48. Such mechanism includes a steering shaft 50 which rotates a drive sprocket 51 by means of a transfer assembly indicated generally at 52 and carried by a frame portion 53. Drive sprocket 51 rotates a driven sprocket 55 by means of a chain 56. The center of driven sprocket 55 includes a hub 57 which is clamped to the conventional steering post of the tractor, said hub being journaled in bearing block 60 mounted on frame member 53 by the bolts 61. Frame member 53 carries an idler sprocket 63 which maintains chain 56 forwardly of the driver and under cover 65.

A support 66 and U-bolt 67 serve to mount the right end offset steearing mechanism 48 to assembly 30, FIG. 4, at a position in front of the driver.

As seen in FIGS. 8 and 9, offset steering mechanism 48 serves as a mount for a hand throttle 70 which includes a rod 71 and a connector 72 for attachment to the conventional hand throttle of the tractor.

Referring again to FIGS. 1 and 2, the apparatus of the present invention further includes a base indicated generally at 80 for attachment to the tractor and a boom assembly indicated generally at 81. The end of boom assembly 81 includes a load carrying means and associated linkage indicated generally at 82.

With reference to FIGS. 1, 2, and 3, base means 80 includes vertical supports 85 and inclined supports 86, the bottoms of which carry appropriate attaching means 87 and 88 for securing the base means to the frame of the tractor. Base means 80 supports a transverse bar 90 which forms a pivot for boom base 91.

The boom assembly 81 comprises a first beam portion 92 which is rigidly secured to a second offset beam portion 94 by means of a truss structure 93.

A beam end member 95 carries a rod 96 which forms a pivotal connection with load carrying means 82. The boom assembly 81 comprising first beam portion 92 and second offset beam portion 94 can be raised and lowered between the raised position indicated by solid delineation and the lower position indicated by dotted delineation by means of a first power cylinder indicated generally at 98, and having a pivotal connection 99 with base 80 and a pivotal connection 100 with beam portion 92.

Figure 7:
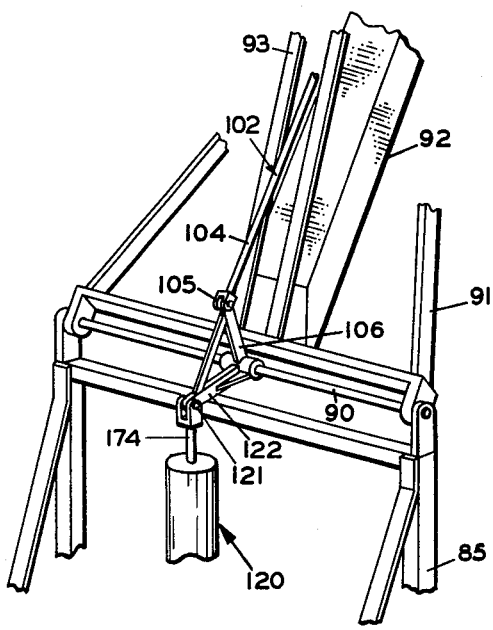
FIG. 7 is a partial perspective view of a portion of the apparatus of FIG. 3.

With reference to FIGS. 1, 3, and 7, a parallel linkage mechanism is indicated generally at 102 and serves to maintain fork members 103 of the load carrying means in various pre-set angles of inclination while beam assembly 81 is being raised and lowered. Moreover, parallel linkage mechanism 102 provides means for inclining fork members 103 downwardly to facilitate pushing same under a load and, further, to dump articles from load carrying means 82 when desired.

Parallel linkage mechanism 102 includes a first rod 104 having a first pivotal connection 105 with a bell crank arm 106, and a second pivotal connection 107 with a bell crank arm 108, said bell crank arm 108 being pivotally mounted to the boom assembly 81 at a pivotal connection 110.

Parallel linkage mechanism 102 further includes a second rod 112 having a first pivotal connection 114 with bell crank arm 115 and a second pivotal connection 116 with load carrying means 82.

A second power cylinder indicated generally at 120 is provided for actuating parallel linkage mechanism 102 and includes a first pivotal connection 121 with a bell crank arm 122, said arm being pivoted to the boom assembly at 90. Power cylinder 120 has a second pivotal connection 124 with base means 80.

As is best seen in FIG. 3 a transverse base member 126 carries two brackets which support the lower pivotal connection 99 and 124 for power cylinders 98 and 120 respectively.

In operation, the floor and seat assembly of FIGURE 4 is secured to the left side of the tractor, as viewed in FIGURE 2, by bolting a main mounting bracket 130 to the left side of the frame of the tractor. The location of bracket 130 is seen in FIGURE 1. With reference to FIGURE 4 a front support bracket 132, a U-bolt 133, and a rear support bracket 35, are also secured to the frame of the tractor to add rigidity to the assembly.

It will be noted from FIGURE 1 of the drawings that when assembly 30 is in mounted relationship on the side of the tractor, footboard 40 extends upwardly and forwardly, with respect to the direction the driver faces, and forms a fender over wheel 22.

The control linkage assembly 45 is next connected to the conventional brake and clutch mechanisms on the tractor so that clutch and brake pedals 42 and 43 can be used in operating the tractor.

Offset steering mechanism 48 is next mounted on the tractor and hub 57 is clamped to the conventional steering post, the steering wheel of the tractor being removed to permit such attachment.

The boom assembly of FIGURE 3 is next positioned on the tractor as seen in FIGURES 1 and 2 by bolting brackets 87 to the front end of the tractor frame and by bolting brackets 88 to the rear end of the tractor frame.

Referring to FIGURE 10, power cylinders 98 and 120 are next connected to a source of pressurized hydraulic fluid carried on the tractor. The source of hydraulic fluid is preferably in the form of a hydraulic pump 150 driven by the main engine of the tractor and including an intake 181 connected to a reservoir 151 by line 156. The hydraulic control assembly further includes a valve 154 for controlling power cylinder 98 and a valve 155 for controlling power cylinder 120. Both of the valves 154 and 155 are of the open center three-position type well known to those skilled in the art. The intakes to valves 154 and 155 are pressurized by fluid from an outlet 180 of pump 150 via a line 157 and the fluid normally passes unrestricted through the open centers of the valves and back to reservoir 151 via a line 158. When it is desired to pressurize the lower side of power cylinder 98 valve 154 is actuated to connect line 157 with line 164 whereby chamber 169 of power cylinder 98 is pressurized. When piston 168 moves upwardly fluid in upper chamber 167 of power cylinder 98 is free to drain to reservoir 151 via passage 166 and line 163. When it is desired to lower boom 81 valve 154 is actuated to release fluid from lower chamber 169 to reservoir 51 via line 164, valve 154, and line 159, to reservoir 151.

When it is desired to increase the angle of inclination of fork members 103, valve 155 is actuated to connect the upper chamber of power cylinder 120 with pump 150 via lines 157 and 162. At the same time the lower chamber 173 of power cylinder 120 is drained via line 161, valve 155, and line 158 to reservoir 151. When it is desired to decrease the angle of inclination of fork members 103 fluid is released from the upper chamber 171 of power cylinder 120 via line 162, valve 155, and line 158 to reservoir 151. At the same time the lower chamber 173 of power cylinder 120 receives fluid from pump 150 via line 157, valve 155 and line 161.

It should be pointed out that when piston 172, FIGURE 10, of power cylinder 120 moves upwardly the angle of inclination of fork members 103 is decreased and, conversely, when piston 172 of power cylinder 120 moves downwardly the angle of inclination of fork members 103 is increased. It will also be understood from a consideration of FIGURE 10, that when piston 168 of power cylinder 98 is moved upwardly boom 81 is raised and, conversely, when piston 168 is lowered boom 81 is also lowered. As seen in FIGURE 1 a pair of valve control levers 153, one for each of the valves 154 and 155, FIG. 10, are located adjacent seat 47 so that the operator can admit and release hydraulic fluid to and from power cylinders 98 and 120.

As seen in FIGURE 10 the outlet of reservoir 151, to which line 156 is connected, includes a filter element 177 for removing foreign particles from the flowing hydraulic fluid.

In operation, when the operator desires to position fork members 103 in a declined configuration he merely operates valve 155 to release fluid from the top of power cylinder 120 and thereby extend rod members 104 and 112 relative to boom assembly 81. This action tilts fork members 103 downwardly about pivot 96. The operator can then lower the boom assembly 81 by operating valve 154 to rerelase hydraulic fluid from power cylinder 98. Fork members 103, in a declined position, can thereby be located at the base of the load. The operator then can advance the tractor and push the fork members 103 under the load. Fork members 103 are next placed in a horizontal disposition, or in an inclined position if desired, by manipulating valve 155 to pressurize power cylinder 120. The load is next lifted by actuating valve 154 to pressurize power cylinder 98. The operator can dump the load by releasing hydraulic fluid from the top of power cylinder 120 while fluid is pumped into the bottom of power cylinder 120. This serves to decline fork members 103 and release the load and dispose same on a loft or other elevated platform.

It should be pointed out that due to the arrangement of the linkage 102 in parallel relationship with boom assembly 81, fork members 103 are always maintained at the same angle, relative to the horizontal, when boom assembly 81 is raised and lowered and power cylinder 120 is maintained stationary. It will be understood that the angle of fork members 103, relative to the horizontal, can be varied by manipulating power cylinder 120 at any height of the boom assembly.

While the form of embodiment of the present invention as herein disclosed constitutes a preferred form, it is to be understood that other forms might be adopted, all coming within the scope of the claims which follow.

I claim:

1. A lift apparatus for attachment to a tractor of the type having front wheels, rear wheels and a forwardly facing seat and steering mechanism, said apparatus comprising, in combination, a rearwardly facing seat and steering assembly for attachment to said tractor at one side of the location for said forwardly facing seat and steering mechanism; a base for attachment to said tractor; a lift assembly including a boom having an end portion, a base portion attached to said base forwardly on said tractor, and a beam portion extended rearwardly over the location for said forwardly facing seat and steering mechanism; and load carrying means on said end portion of said boom.

2. A lift apparatus for attachment to a tractor of the type having front wheels, rear wheels and a forwardly facing seat and steering mechanism, said apparatus comprising, in combination, a rearwardly facing seat and steering assembly for attachment to said tractor at one side of the location for said forwardly facing seat and steering mechanism; a base for attachment to said tractor; a lift assembly including a boom having an end portion, a base portion attached to said base forwardly on said tractor, and a beam portion extended rearwardly over the location for said forwardly facing seat and steering mechanism; load-carrying means on said end portion of said boom, and driving means operatively connecting said rearwardly facing steering assembly with said forwardly facing steering mechanism.

3. A lift apparatus for attachment to a tractor of the type having front wheels, rear wheels and a forwardly facing seat and steering mechanism, said apparatus comprising, in combination, a rearwardly facing seat and steering assembly for attachment to said tractor at one side of the location for said forwardly facing seat and steering mechanism; a base for attachment to said tractor; a lift assembly including a boom having an end portion, a base portion attached to said base forwardly on said tractor, and a beam portion extended rearwardly over the location for said forwardly facing seat and steering mechanism; load carrying means on said end portion of said boom, and including a platform for disposition under a load; linkage apparatus extended along said beam portion and including a first end and a second end operatively connected to said load carrying means; a first power means connected between said beam portion and said base for raising and lowering said beam portion; and a second power means connected between said first end of said linkage apparatus and said base.

4. The apparatus of claim 3 wherein a driving means operatively connects said rearwardly facing steering assembly with said forwardly facing steering mechanism.

5. A lift apparatus for attachment to a tractor of the type having front wheels, rear wheels and a forwardly facing seat and steering mechanism, said apparatus comprising, in combination, a rearwardly facing seat and steering assembly for attachment to said tractor at one side of the location for said forwardly facing seat and steering mechanism; a base for attachment to said tractor; a first beam portion including a first pivotal connection with said base at a portion of said base disposed forwardly of said seat and steering assembly; a second beam portion connected to said first beam portion at a junction, said second beam portion being inclined downwardly relative to said first beam portion, said beam portions being extended rearwardly over the location for said forwardly facing seat and steering mechanism; load carrying means including a second pivotal connection with said second beam portion; linkage apparatus extended along said beam portions and including a first end and a second end attached to said load carrying means; a first power means connected between said first beam portion and said base for raising and lowering said beam portions about said first pivotal connection; and a second power means connected between said first end of said linkage apparatus and said base.

6. A lift apparatus for attachment to a tractor of the type having front wheels, rear wheels and a forwardly facing seat and steering mechanism, said apparatus comprising, in combination, a rearwardly facing seat and steering assembly for attachment to said tractor at one side of the location for said forwardly facing seat and steering mechanism; a base for attachment to said tractor; a first beam portion including a first pivotal connection with said base at a portion of said base disposed forwardly of said seat and steering assembly; a second beam portion connected to said first beam portion at a junction, said second beam portion being inclined downwardly relative to said first beam portion, said beam portions being extended rearwardly over the location from said forwardly facing seat and steering mechanism; load carrying means including a second pivotal connection with said second beam portion; a first linkage connector in parallel extension with said first beam portion, a second linkage connector in parallel extension with said second beam portion and connected between said first linkage connector and said load carrying means; a first power means connected between said first beam portion and said base for raising and lowering said beam portions about said first pivotal connection; and a second power means connected between said first linkage connector and said base.

References Cited in the file of this patent

UNITED STATES PATENTS

| 2,617,661 | Kucera | Nov. 11, 1952 |
| 2,668,631 | Reese | Feb. 9, 1954 |
| 2,774,496 | Dorkins | Dec. 18, 1956 |
| 2,791,341 | Michaels | May 7, 1957 |
| 2,821,313 | Warner | Jan. 28 1958 |